United States Patent [19]

Cowan

[11] Patent Number: 4,566,860

[45] Date of Patent: Jan. 28, 1986

[54] LIQUID PISTON COMPRESSION SYSTEMS FOR COMPRESSING STEAM

[76] Inventor: Ben Cowan, 5757 Cavendish Blvd., Montreal, Quebec, Canada, H4W 3W8

[21] Appl. No.: 598,035

[22] Filed: Apr. 9, 1984

[30] Foreign Application Priority Data

Mar. 28, 1984 [CA] Canada ................................ 450687

[51] Int. Cl.[4] ............................................... F04F 11/00
[52] U.S. Cl. .................................................... 417/102
[58] Field of Search ............... 417/102, 103, 122, 123, 417/125; 60/653, 674

[56] References Cited

U.S. PATENT DOCUMENTS

| | | | |
|---|---|---|---|
| 336,224 | 2/1886 | Ferrot | 417/103 |
| 694,885 | 3/1902 | O'Connell | 417/102 |
| 722,968 | 3/1903 | Gastal | 417/102 |
| 848,775 | 4/1907 | Selakosky | 417/102 |
| 1,011,226 | 12/1911 | Miller | 417/102 |
| 1,044,583 | 11/1912 | Selakosky | 417/103 |
| 1,406,556 | 2/1922 | Haven | 417/103 |
| 1,508,618 | 9/1924 | Siefert | 417/125 |
| 1,550,437 | 8/1925 | Haven | 417/102 |
| 1,690,254 | 11/1928 | Skidmore, Jr. | 417/102 |
| 1,766,998 | 6/1930 | Jacocks | 417/102 |
| 1,902,961 | 3/1933 | La Bour | 417/102 |
| 2,549,620 | 4/1951 | Mitchell | 417/102 |
| 2,704,034 | 3/1955 | Jones | 417/102 |
| 2,862,653 | 12/1958 | Shapiro | 417/103 |
| 3,602,612 | 8/1971 | Osdor | 417/102 |
| 4,321,016 | 3/1982 | Sakamoto et al. | 417/102 X |

FOREIGN PATENT DOCUMENTS 1920558  3/1978  Fed. Rep. of Germany ........ 60/653

Primary Examiner—Richard E. Gluck
Attorney, Agent, or Firm—Schwartz, Jeffery, Schwaab, Mack, Blumenthal & Evans

[57] ABSTRACT

The present invention relates to a method and to systems which can be used to recover waste heat available in the form of low pressure steam by compressing such steam in a compression system of the liquid piston type to provide steam of a higher pressure. The higher pressure steam can then be more advantageously used in industrial processes.

11 Claims, 10 Drawing Figures

LIQUID PISTON COMPRESSION SYSTEMS FOR COMPRESSING STEAM

The present invention relates to a method and to systems which can be used to recover waste heat available in the form of low pressure steam e.g. to recover waste heat available from industrial processes, for example in pulp and paper mill processes.

Waste heat can be found in a large number of locations in a pulp and paper mill as clean low pressure steam, the pressure varying from a few pounds above atmospheric pressure to as much as 30 lbs s.i.g. . An efficient method for recovery of the available heat is to recover the heat of vaporisation which constitutes the greatest portion of this contained energy. However the steam must be recovered at a pressure which will allow it to be reused in the manufacturing process. The desirable pressure for use in a paper mill system is a pressure of at least 60 lbs s.i.g., preferably 75 lbs s.i.g..

Since waste steam can be found at scattered locations in an industrial plant and can be of varying pressures and volumes (e.g. small) it would be advantageous to have a steam compression system which can be tailored to requirements, is of relatively small size and which can be located at the source of the waste steam. It would also be advantageous for such systems to be mechanically simple and not require any sophisticated operation or controls i.e. be relatively cheap to build and operate.

Systems are presently available which can be used for boosting pressure. These systems include:
(a) Thermo compressors using high pressure steam (Injectors).

These are inefficient and unwieldly (e.g. using 200 p.s.i.g. motive steam, 1 lb of motive steam is required to raise the pressure of 0.15 lbs recovered steam from 20 p.s.i.g. to 75 p.s.i.g. or approximately 6 lbs high pressure steam to 1 lb of recovered steam). In addition, this system is impossible to control automatically for varying conditions of waste steam.
(b) Mechanical thermo compressors.

These are complicated, expensive and sophisticated units which are designed for special applications of steady flow such as multiple effect evaporator systems. They are not standard equipment and are too expensive for use in small applications.
(c) Heat pump A chemical heat pump designed by the Rocket Research Company offers unique qualities of size and simplicity. However it will recover only 30% of the waste heat available, the remaining 70% being condensed to maintain the process.

The present invention provides a method for compressing steam from low pressure to a higher pressure in a compression system of the liquid piston type said compression system being provided with first and second compression chambers, each chamber being provided with a unidirectional low pressure inflow steam conduit and a unidirectional high pressure outflow steam conduit, characterized by
alternately inducing a suction stroke and a compression stroke in said first and second chambers by reciprocatingly transfering a suitable compressing liquid between said first and second compression chambers,
and wherein low pressure steam is drawn into a chamber on a suction stroke from said unidirectional low pressure inflow conduit and low pressure steam is compressed in a chamber on a compression stroke, compressed steam being recovered from said unidirectional high pressure outflow conduit.

In accordance with another aspect the present invention provides a compression system of the liquid piston type suitable for compressing steam from a low pressure to a higher pressure comprising
  (a) an inner compression chamber
  (b) an outer jacket compression chamber, the wall of the inner chamber defining the inner wall of the outer chamber,
  (c) a pump operatively connected to said compression chambers
  (d) a switch valve adapted to cause a suitable compressing liquid present in the system to be withdrawn by the pump from each of the chambers in turn and forced into the other,
and
  (e) level indicator means adapted to cooperate with the switch valve to induce the valve to reverse the flow of compressing liquid between the chambers once a predetermined upper level of liquid is present in a chamber,
both chambers being provided with a unidirectional low pressure inflow steam conduit and a unidirectional high pressure outflow steam conduit.

In a further aspect the present invention provides a compression system of the liquid piston type suitable for compressing steam from a low pressure to a higher pressure comprising
  (a) a compression chamber consisting of an upper steam compression chamber and a lower compressing liquid reservoir, said upper chamber being provided with a unidirectional low pressure inflow steam conduit and a unidirectional high pressure outflow steam conduit, said upper chamber being in liquid communication with said lower resevoir,
  (b) a volume displacer movable between a first suction position and a second compression position in the lower reservoir,
and
  (e) driving means operatively connected to said volume displacer for urging the volume displacer back and forth between said first and second positions whereby displacement of the volume displacer from the first position to the second position induces a compression stroke in the upper chamber by forcing compressing liquid from the lower reservoir into the upper chamber and displacement of the volume displacer from the second position to the first position induces a suction stroke in the upper chamber by withdrawing compressing liquid from the upper chamber into the lower reservoir.

In particular the present invention provides a compression system of the liquid piston type suitable for compressing steam from low pressure to a higher pressure
  (a) two compression chambers, each consisting of an upper steam compression chamber and a lower compressing liquid reservoir, said upper chambers, each being provided with a unidirectional low pressure inflow steam conduit, and a unidirectional high pressure outflow steam conduit, said upper chambers being in liquid communication with a respective lower reservoir, said lower reservoirs sharing a common side wall, said side wall being provided with an orifice, (b) a shared volume displacer disposed in said orifice and movable between a first suction position and a second compression position in each of the lower reservoirs (c) sealing means disposed about the periphery of the orifice, said sealing means being in liquid sealing engagement with the shared volume displacer, said volume displacer being dimensioned such that when it occupies the second position in one of the lower reservoirs it also occupies the first position of the other lower reservoir, and (d) driving means operatively connected to said shared volume displacer for urging the shared volume displacer back and forth between said first and second positions whereby displacement of said displacer from a first position to a second position induces a compression stroke in an upper chamber by forcing compressing liquid from a respective lower reservoir into the upper chamber, and displacement of said displacer from a second position to a first position induces a suction stroke in an upper chamber by withdrawing compressing liquid from the upper chamber into a respective lower reservoir.

In accordance with the invention the compressing liquid may be water. Alternatively the compressing liquid may be any high boiling point liquid suitable for the temperature and pressure conditions desired, e.g. glycol, solutions (e.g. aqueous) of sodium or calcium chloride.

In drawings which illustrate embodiments of the invention:

FIG. 1 illustrates a compression system suitable for use with the method of the present invention, FIG. 2 illustrates a compact system in accordance with the present invention, i.e. concentric chambers, FIG. 3 is a section of FIG. 2, FIG. 4 illustrates a compression system, in accordance with the invention, using a shared volume displacer, FIG. 4a is a section of the line A—A of FIG. 4 showing the common wall for the system, a shared volume displacer and sealing means engaging the common wall and the displacer.

Compression systems of the liquid piston type are known. Such system are described for example in the following U.S. Pat. Nos.:

| | | |
|---|---|---|
| 4,321,016 | 3,602,612 | 2,704,023 |
| 2,549,620 | 1,902,961 | 1,690,254 |
| 1,011,226 | 848,775 | 722,968 |
| 694,885 | | |

These patents describe the use of systems to compress air or other gas (U.S. Pat. Nos. 694,895 and 2,549,620) or deal with the use of said systems to separate a liquid from vapour and/or gas (U.S. Pat. Nos. 1,690,254 and 1,902,961).

In accordance with the present invention compression systems of the liquid piston type can be used to compress low pressure steam (e.g. 15 lbs s.i.g. ) to higher pressure steam (e.g. 75 lbs s.i.g.).

Figure 1:
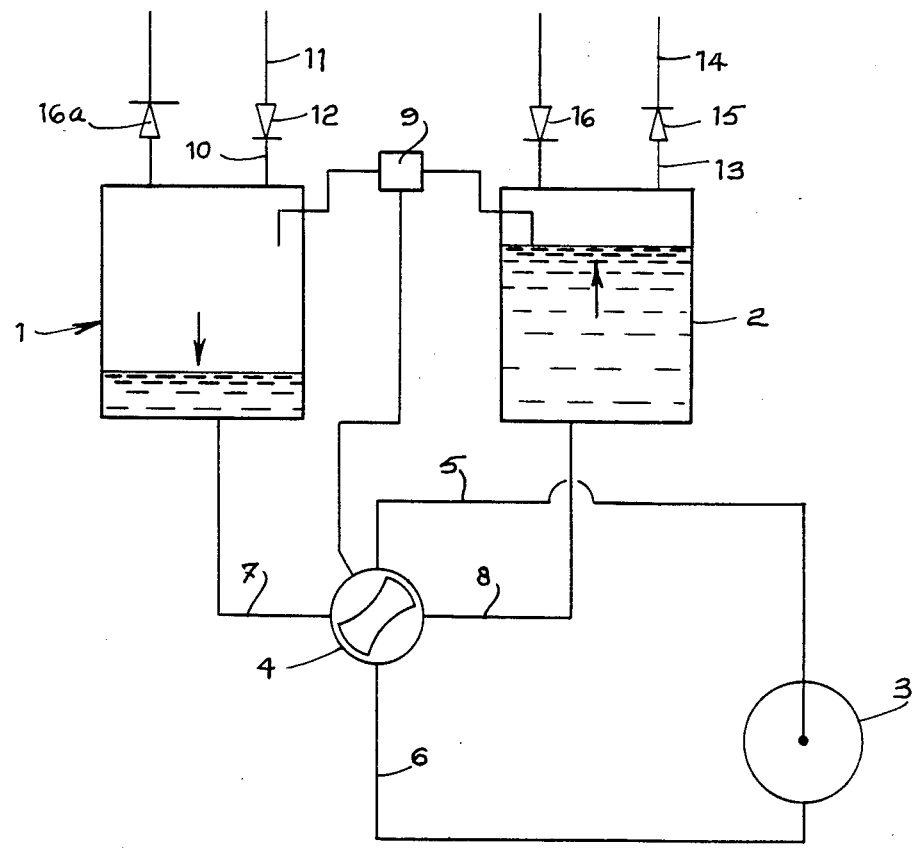

FIG. 1 illustrates a compression system which can carry out the method of the present invention. As can be seen the illustrated system includes two drum tanks 1 and 2. These tanks are of the same size and are at the same ground level. The system is also provided with a pump 3 and a switch valve 4. A suitable liquid, depending on the operating temperature range, can be used as a liquid piston to effect compression/suction strokes for the system. The system further includes level indicator means 9 which cooperates with the switch valve 4 to induce it to reverse the direction of flow of liquid, between tanks 1 and 2. If desired the system can also include means for adding to or withdrawing drawing liquid from the system i.e. a bleeder valve. The tanks, piping etc. can be insulated to reduce heat loss.

In accordance with the method of the present invention steam can be compressed using the above system as follows. The pump 3 which can be of any suitable type (e.g. centrifugal) is allowed to operate continuously. In FIG. 1 liquid is shown as passing from tank 1 to tank 2 i.e. the liquid passes through pipe 7 to switch 4 which directs it to pipe 5 which feeds it to pump 3 and thereafter it proceeds through pipe 6 back to switch 4 which directs it through pipe 8 to tank 2.

As the liquid level in tank 1 drops, it induces a suction stroke during which low pressure steam enters the tank via the unidirectional low pressure inflow steam conduct consisting of piping 10 and 11 and the check valve 12. The steam is delivered from a source which is not shown. In contrast as the liquid level in tank 2 rises it induces a compression stroke whereby low pressure steam trapped in tank 2 during a previous suction stroke is compressed. As the compressed steam reaches the desired level (e.g. 75 lbs s.i.g.) it is recovered via the unidirectional high pressure outflow steam conduct consisting of piping 13 and 14 and check valve 15. The high pressure steam is delivered to some area of use (not shown). On the compression stroke the check valve 16 which forms part of the second tank's unidirectional steam inflow conduit, is forced closed due to the compression effected by the rising liquid piston. On the other hand as tank 1 undergoes the suction stroke the check valve 16a which forms part of this tank's unidirectional steam outflow conduit, is forced closed due to the higher pressure in the downstream side of the conduit.

Once the liquid in tank 2 reaches a predetermined level the level indicator 9 (which can be of any suitable construction such as those illustrated in the above U.S. patents) is activated and it induces switch valve 4 to reverse the flow of liquid from tank 2 to tank 1 such that tank 2 is subjected to a suction stroke whereas tank 1 undergoes a compression stroke.

Accordingly, as liquid reciprocates (i.e. cycles) between tanks 1 and 2 it will on the one hand compress low pressure steam in one tank while drawing in low pressure stream into the other tank.

The compression stroke in one tank is assisted by the column of liquid which is falling in the other (i.e. by the difference in liquid level, i.e. head).

The compression is not adiabatic but occurs along the line of the pressure-temperature saturation curve since any heat of compression will be converted to steam due to the presence of liquid in the tanks (e.g.,wet cylinder walls); if necessary a desuperheating water spray 50 may be provided for use during a compression cycle. (See FIG. 2) This will reduce the amount of outside energy necessary for the pressure raising process, and also convert some of the energy used for this purpose into additional useful energy as fresh steam. In this way the minimum energy is required for compression (see FIG. 8).

As can be seen from the above the method can make use of a system which consists of a simple pump, plain tank, standard check valves, ordinary piping, a simple switch valve and simple level indicator means. The method therefor takes advantage of a system operating as a reciprocating compressor without the use of expensive mechanical equipment. The system can be self-regulating and adjust automatically to any pressure conditions. The inlet check valve will open to admit low pressure steam as soon as the level begins to fall in the chamber. The discharge check valve will open to reject high pressure steam as soon as the pressure reaches that of the discharge header.

The method can be used to achieve a variable level of heat recovery for a given heat source, limited of course by, equipment limits.

The method has been described in relation to clean steam, however it may be used to recover energy from contaminated steam i.e. steam mixed with air, volatile organic compounds or other contaminants (e.g. particulate). In this case contaminated steam can be compressed to a suitable pressure and be sent to a heat exchanger (e.g. reboiler) and will then generate clean steam at a slightly lower pressure which can be used in plant processes.

Figure 2:
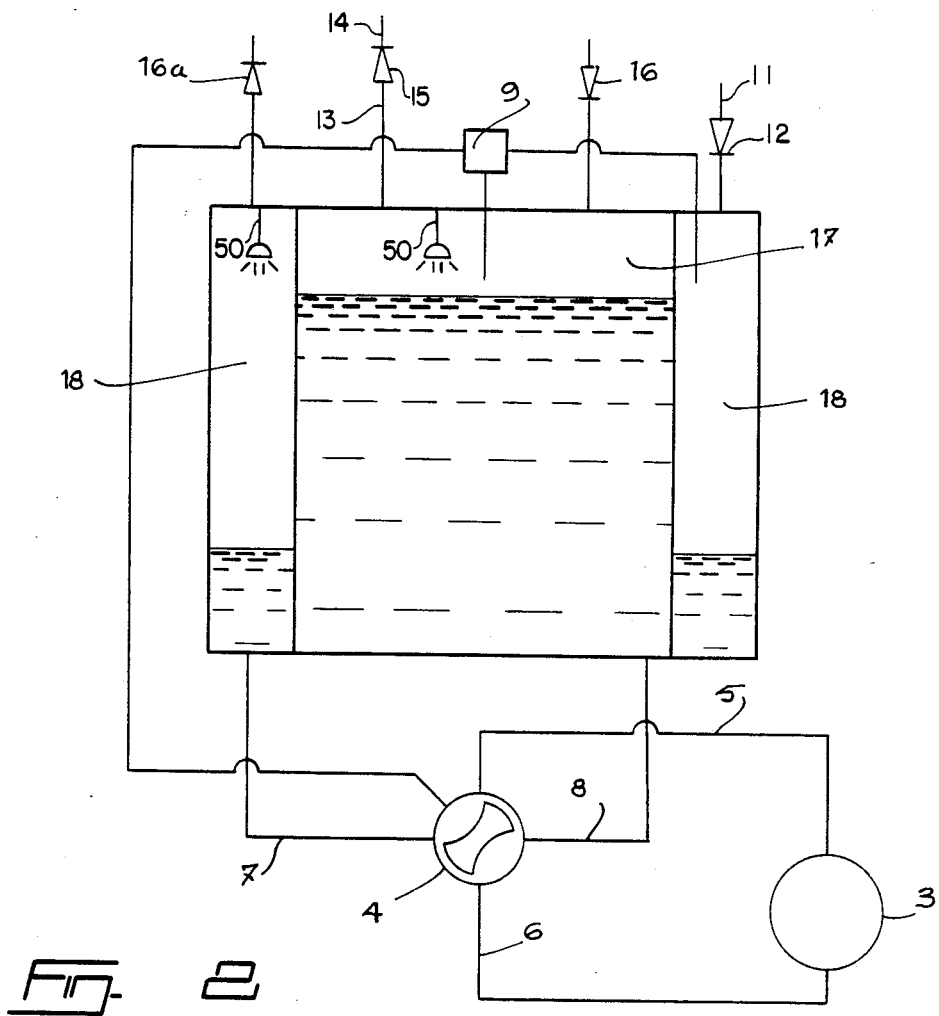
Figure 3:
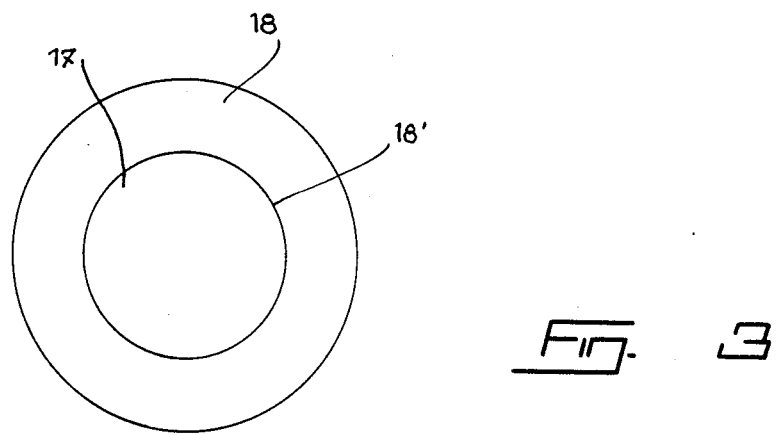

FIGS. 2 and 3 illustrate an additional aspect of the present invention i.e. an example of a compact compression system suitable for compressing low pressure steam in accordance with the method of the present invention. The essential characteristic of the compact system illustrated is the use of two concentric tanks. This disposition of the compression chambers allows not only for a space saving but also reduces the heat radiation surface and consequently the attendent loss of heat from the system relative to a system using two separate tanks.

In FIG. 2 the same reference numbers have been used to refer to those elements which are common with the system illustrated in FIG. 1.

In the illustrated embodiment the cross sectional area of the inner chamber 17 and the outer jacket chamber 18 are equal (see FIG. 3). In this embodiment the chambers share a common wall 18', which acts as the outer wall for the inner chamber 17 and the inner wall for the outer jacket 18, the latter having the configuration of an annular ring.

The compact system can compress steam in the same manner as described for the system illustrated in FIG. 1.

Figure 4:
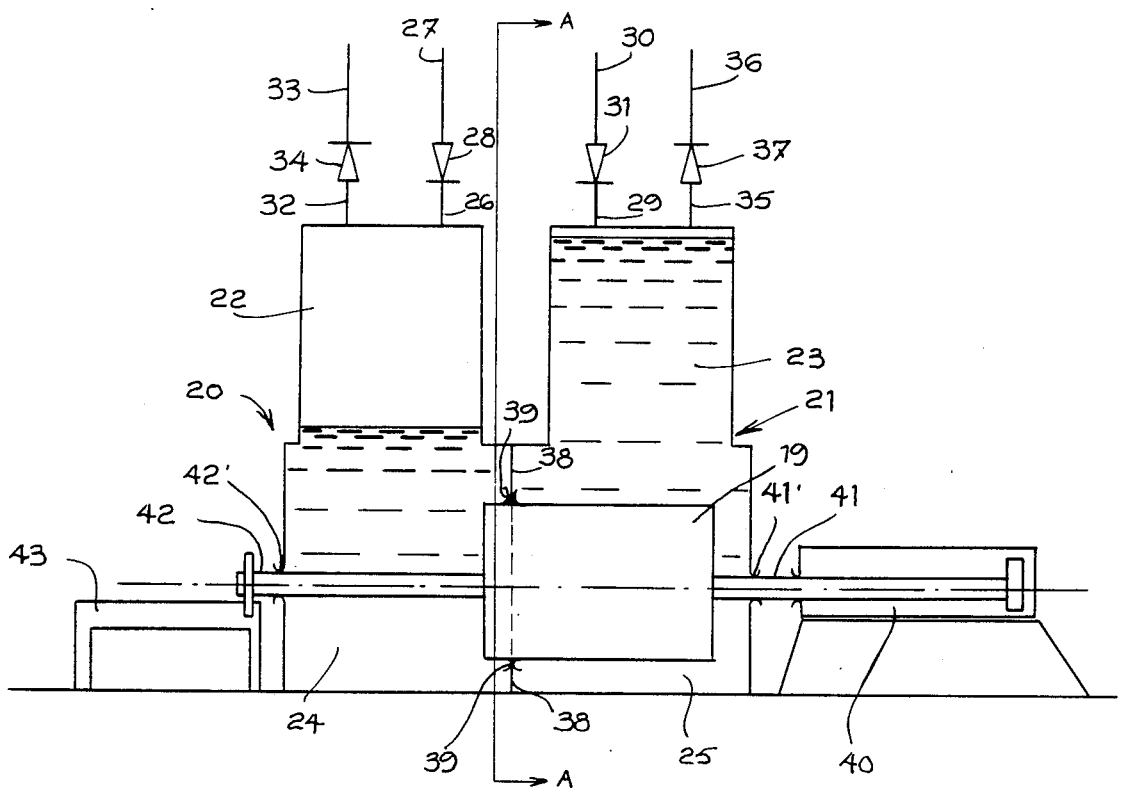

In another aspect, as indicated above, the present invention provides a simple compression system for compressing steam. An embodiment of this system is illustrated in FIG. 4. The essential characteristic of this system is that it makes use of a shared volume displacer 19 which in the illustrated embodiment has the configuration of a circular cylindrical drum. The volume displacer eliminates the need for a switch valve, pump and attendent piping. It thus eliminates a point of energy loss i.e. the pump and can inhibit the turbulence caused by the in rush of liquid in a compression chamber during a compression stroke.

The compression system illustrated in FIG. 4 consists of two compression chambers indicated generally as 20 and 21. Each of the compression chambers includes a respective upper steam compression chamber 22 or 23 as well as a respective lower compressing liquid reservoir 24 or 25; in the illustrated system water is the compressing liquid, but any suitable fluid or liquid can be used taking into account the necessity to avoid vaporization at low pressure, and high temperature. The upper chamber 22 is provided with unidirectional inflow steam conduit consisting of piping 26, 27, and check valve 28; upper chamber 23 is provided with a corresponding conduit consisting of piping 29, 30 and check valve 31. The upper chamber 22 is also provided with a unidirectional outflow steam conduit consisting of piping 32, 33 and check valve 34; upper chamber 23 is provided with a corresponding conduit consisting of piping 35, 36 and check valve 37.

Figure 4A:
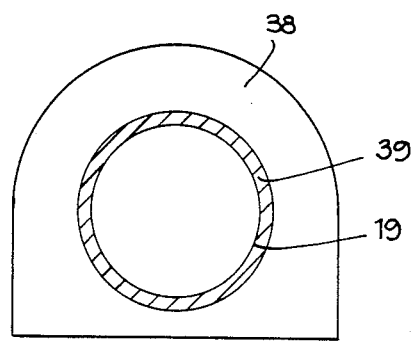

The lower reservoirs 24 and 25 share a common wall 38. The wall 38 is provided with a orifice of circular configuration and the shared volume displacer is disposed therein as shown. The periphery of the orifice is provided with a seal 39 which is in liquid sealing engagement with the shared volume displacer 19, see FIG. 4a.

The driving means consists of a hydraulic cylinder 40 actuated by a pressure pump set not shown. The hydraulic cylinder is operatively connected to the shared volume displacer 19 by a shaft 41 which passes through the side wall of the lower reservoir 25, suitable sealing means 41' being provided to inhibit leakage of the water. Another shaft 42 is operatively connected to the other side of the shared volume displacer and it extends through the side wall of the lower reservoir 24; sealing means 42' being provided to again avoid or inhibit leakage of water. The shaft 42 engages support means 43 which is configured such that as the volume displacer 19 is urged between the two lower reservoirs 24 and 25 it causes the displacer to rotate, the rotation of the displacer being induced to reduce wear of the seal 39 and increase the seal's life.

The shared volume displacer is configured such that it has a volume equal to the volume of water which it is desired to displace from a liquid reservoir into an upper steam compression chamber (i.e. to bring about the desired compression). In FIG. 4 the shared volume displacer 19 is shown occupying the second compression position in the lower reservoir 25. As a result the upper chamber 23 is substantially occupied by water which has been displaced from the lower reservoir 25. Simultaneously, the shared volume displacer 19 also occupies the first suction position in the lower reservoir 24. As a result the water is seen to occupy the substantial volume of the lower reservoir 24; the upper chamber 22 being filled with low pressure steam entering through check volume 28.

In operation the hydraulic actuating means 40 causes the shared volume displacer 19 to travel back and forth between the second compression positions in each of the lower reservoirs 24 and 25. This rocking movement induces the water in each of the lower reservoirs 24 and 25 to alternately rise and fall in their respective upper steam compression chambers 22 and 23. Thus while one compression chamber is undergoing a compression stroke the other chamber is undergoing a suction stroke.

Once the steam pressure reaches the desired level during a compression stroke (e.g. 75 lbs s.i.g.) the check valve 37 (or 34) opens to allow the compressed steam to be delivered to a high pressure steam conduit (not shown) for distribution and use. During a suction stroke (i.e. when the level of water is falling) the steam inflow valve 28 (or 31) formerly forced shut by the greater pressure in the upper compression chamber opens as the pressure in the upper compression chamber drops below the pressure in the inflow conduit. In this manner fresh low pressure steam is introduced into an upper chamber. Thereafter the compression stroke is repeated to compress the low pressure steam present in the chamber.

As an alternative the volume displacer may consist of a suitable inflatable bladder system disposed in the lower portion of the lower reservoir; in such case there will not be any need for an orifice in the wall 38. The inflation/deflation of the bladder will in this case induce the water to rise and fall in the upper chamber.

The system illustrated in FIG. 4 is mechanically simple, the rate of movement of the displacer being easily controllable with the hydraulic actuator. Any suitable kind of mechanical or electrical reciprocating mechanism may however, be used as the driving means.

A perfect seal between the lower reservoirs is not necessary due to the reciprocating nature of the pressure in each of the chambers. Any liquid imbalance can, however, be dealt with by providing the chambers with suitable liquid bleeder valves and with water inflow conduits means both operatively connected to suitable automatic water level indication means which could periodically adjust the level of water in each chamber.

Figure 5:
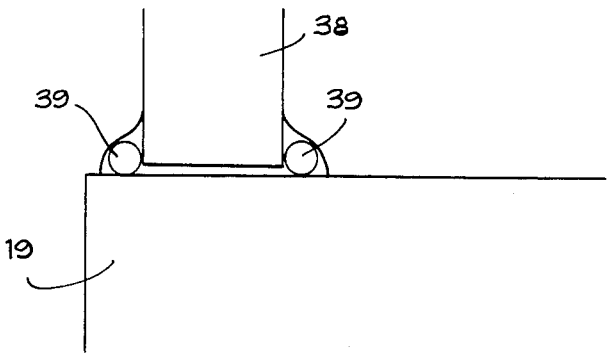
FIGS. 5, 6 and 7 illustrate partial cross-sectional views of possible sealing means for engagement with the shared volume displacer.
Figure 6:
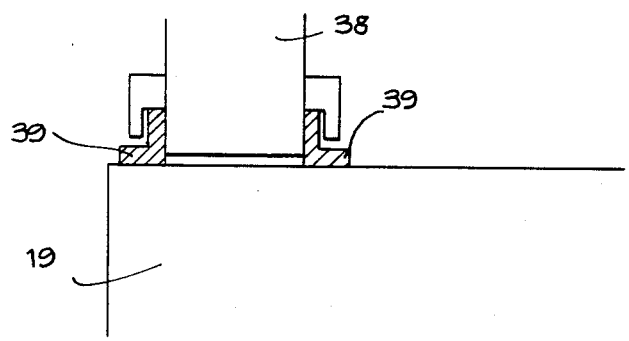
Figure 7:
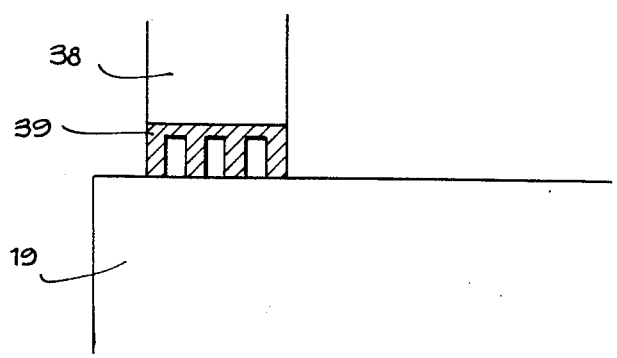

The sealing means engaging the volume displacer 19 or the shafts 41 and 42 may be of any suitable type and construction such as a labyrinth type (FIG. 7), O-ring type (FIG. 5), plain lip type (FIG. 6) or some combination thereof. Labyrinth seals are further illustrated in Kents Mechanical Enginering Handbook (page 804).

If necessary, for the systems making use of a pump (i.e. centrifugal) heat dispersion fins may be put on the piping and/or other cooling means applied to the compression chamber to cool the water being displaced (i.e. to inhibit flashing in the pump suction).

Figure 8:
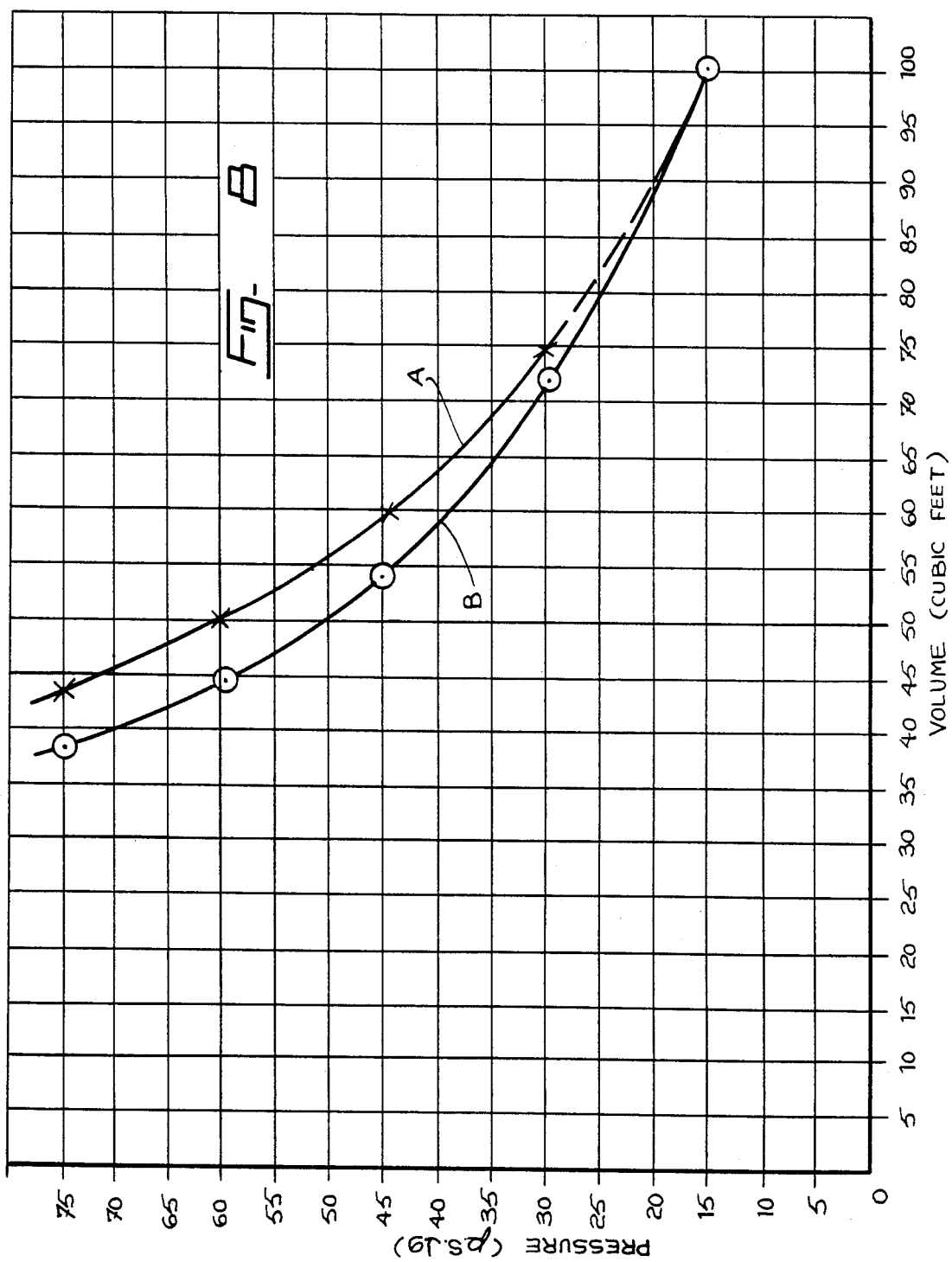
FIG. 8 illustrates a curve showing actual compression diagram vs theoretical adiabatic compression.

FIG. 8 illustrate a P-V diagram with respect to the compression of 100 c.f. of 15 lbs s.i.g. steam to 75 lbs s.i.g. steam occupying 38.39 c.f. The curve portion A shows adiabatic compression resulting in a volume of 43.31 c.f. of 75 lbs s.i.g. steam (i.e. 7.267 lbs thereof). The curve portion B shows the compression curve at saturation by desuperheating compression to 75 lbs s.i.g. at 38.39 c.f. to obtain 7.827 lbs from 100 c.f. steam at 15 p.s.i.g. (7.267 lbs), the weight increase coming from the water flashed to steam in the chamber.

As indicated earlier the system can be provided with any suitable means for automatically monitoring and adjusting the liquid level in the chamber.

A system suitable for the method of the present invention may have the following characteristics:

(a) Inlet low pressure 15 p.s.i.g.
   Outlet high pressure 75 p.s.i.g.
   (Note that any pressures may be used).
(b) Each module consists of
   2 cylinders
   1 control valve
   1 centrifugal pump or double acting displacer
(c) Each cylinder
   60 inches diameter × 60 inches stroke
   operating volume: 100 cu. ft.
   complete cycles: 4 per minute
(d) Steam production from 1 module
   = 7.827 × 4 × 2 × 60
   = 3756.96 lbs/hour -continued (e) Allow for volumetric inefficiency
   3000 lbs/hour
(f) Centrifugal pump for each module
   = 2 × 3000 = 6000 USGPM.
(g) Operating at 60 p.s.i.g. = 140 ft. head.
(h) Theoretical power for vapour compression
   = 50 HP/cylinder
   = 100 HP/module
(i) Pump HP calculated at 80% efficiency
   = 92 HP/cylinder
   = 184 HP/module
(j) 3000 lbs steam requires 184 HP hours
   = 137 KWH
   Therefore, 1000 lbs steam requires
   $\frac{137}{3} = 48$ KWH.

The various elements of the systems can of course be made of any suitable materials e.g. pressure resistant.

Figure 9:
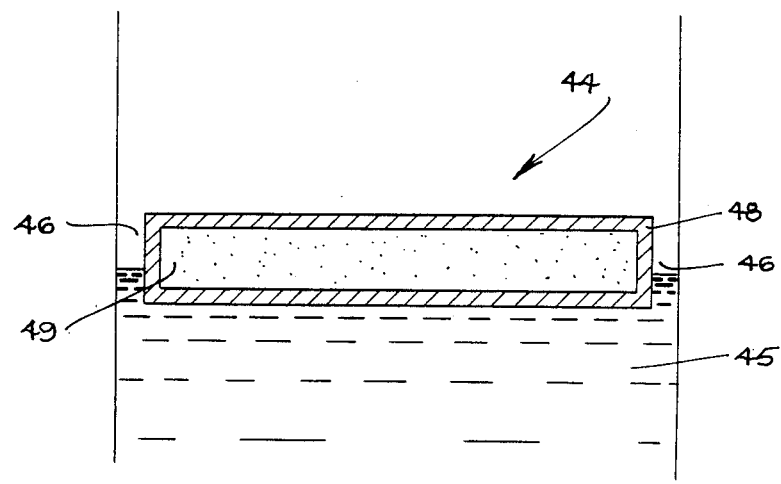
FIG. 9 illustrates a cross-section of a floating condensation shield.

During the compression or pressure stroke, steam being compressed may undergo condensation by contact with cooler liquid compressing fluid. If condensation does occur, it may be inhibited by providing a compression chamber with a suitable floating condensation shield. FIG. 9 illustrates such a shield. The shield indicated generally at 44 floats on the surface of the compressing fluid or liquid 45. The shield is configured to provide a small gap 46 between it and the wall 47 of the compression chamber. The shield shown is of a sandwich type, i.e. it includes a thin liquid tight outer metallic layer 48 which encloses an inner filler 49. The metallic layer can be of any suitable metal such as aluminum or stainless steel while the inner material can be of any light heat resistant material such as styrofoam; the inner material may also include asbestos. The overall density of the shield must of course be such that it will float on the surface of the compressing liquid 45. The shield should have a very small heat absorption capacity while on the other hand it must shield the water from direct contact with the steam (except at the exposed clearances around the rim of the shield) and must rapidly approach the contact steam temperature and have little condensing effect on the vapor.

As indicated above, the compressing liquid, in addition to water, may be any high boiling point liquid suitable for the temperature and pressure conditions desired. A 65% by weight solution of calcium chloride or a 50% by weight solution of sodium chloride can be used as alternatives to glycol, etc., i.e. in aqueous solutions.

In the systems referred to above, a pocket of high pressure steam can be found in a compression chamber just prior to the commencement of the suction stroke in the same chamber. If this pocket of high pressure steam is maintained in the chamber, it will reduce the weight of low pressure steam which can be introduced into the chamber during the suction stroke relative to the maximum theoretical weight if the pocket was not present. Accordingly, in order to improve the overall efficiency of the system in respect of power and capacity the above systems can be provided with venting means consisting of suitable piping and valves whereby some of the high pressure steam can be vented into the other adjacent compression chamber just prior to its compression stroke; as a result of such venting, it is possible to get more low pressure steam into a chamber during the suction stroke and thus get more steam out of the system on a compression stroke.

The embodiments of the invention in which an exclusive property or privilege is claimed are defined as follows:

1. An apparatus for compressing steam, comprising:
    first and second compression chambers, each said chamber containing a quantity of compressing liquid, said liquid defining in each chamber a liquid level and a space above said liquid level;
    unidirectional flow means in fluid communication with each said chamber, said flow means including a low pressure steam inflow conduit and a high pressure steam outflow conduit;
    means for displacing the compressing liquid in said first chamber outwardly to thereby lower said liquid level therein and induce a suction stroke for admitting steam into said space in said first chamber, and simultaneously for displacing the compressing liquid in said second chamber inwardly to thereby raise said liquid level therein and induce a compression stroke for compressing steam in said second chamber;
    means for reversing the displacement in cyclic fashion to thereby induce a compression stroke in said first chamber and a suction stroke in said second chamber;
    means for desuperheating said steam during said compression strokes, said means including a separate water spray positioned in said space of each said chamber; and
    wherein said steam inflow conduit admits low pressure steam during said suction stroke, and wherein said steam outflow conduit releases high pressure steam during said compression stroke.

2. An apparatus according to claim 1, wherein said first and second compression chambers comprise, respectively, an inner compression chamber having a wall and an outer jacket compression chamber, having an inner wall, the wall of the inner chamber defining the inner wall of the outer chamber, and wherein said means for displacing said compressing liquid includes a pump operatively connected to said compression chambers.

3. An apparatus according to claim 2, wherein said chambers are concentric, said outer jacket compression chamber having the configuration of an annular ring.

4. An apparatus according to claim 1, wherein said means for reversing the displacement includes a switch valve adapted to cause said compressing liquid to be withdrawn by said pumps from each of said chambers in turn and forced into the other said chamber.

5. An apparatus according to claim 4, wherein said apparatus includes level indicator means adapted to cooperate with said switch valve to induce said switch valve to reverse the flow of said compressing liquid between said chambers once a predetermined upper level of liquid is present in one of said chambers.

6. An apparatus according to claim 1, wherein said compressing liquid is water.

7. An apparatus according to claim 1, wherein said compressing liquid is glycol.

8. An apparatus according to claim 1, wherein said compression chambers each comprise an upper steam compression chamber and a lower compressing liquid reservoir, said unidirectional flow means being positioned in said upper chambers, said upper chambers being in liquid communication with a respective lower reservoir, said lower reservoirs sharing a common side wall, said side wall being provided with an orifice, and wherein said means for displacing the compressing liquid and said means for reversing the displacement include:
    a shared volume displacer disposed in said orifice and movable between a first suction position and a second compression position in each of the lower reservoirs;
    sealing means disposed about the periphery of said orifice, said sealing means being in liquid sealing engagement with said shared volume displacer, said volume displacer being dimensioned such that when it occupies the second position in one of the lower reservoirs it also occupies the first position of the other lower reservoir; and
    driving means operatively connected to said shared volume displacer for urging the shared volume displacer back and forth between said first and second positions whereby displacement of said displacer from a first position to a second position induces a compression stroke in one of said upper chambers by forcing compressing liquid from a respective lower reservoir into said one upper chamber and displacement of said displacer from a second position to a first position induces a suction stroke in said one upper chamber by withdrawing compressing liquid from said one upper chamber into a respective lower reservoir.

9. An apparatus system according to claim 8, wherein the orifice is circular and the shared volume displacer has the configuration of a circular cylinder.

10. A compression system according to claim 8, wherein the compressing liquid to be used is water.

11. A compression system according to claim 8, wherein the compressing liquid to be used is glycol.

* * * * *